United States Patent [19]

Bartholomew et al.

[11] 4,133,665

[45] Jan. 9, 1979

[54] HYDRATION OF SILICATE GLASSES IN ALCOHOL-WATER SOLUTIONS

[75] Inventors: Roger F. Bartholomew; William L. Haynes, both of Painted Post; Leon M. Sanford, Corning, all of N.Y.

[73] Assignee: Corning Glass Works, Corning, N.Y.

[21] Appl. No.: 829,731

[22] Filed: Sep. 1, 1977

[51] Int. Cl.$^2$ .................. C03C 15/00; C03B 21/00
[52] U.S. Cl. ................. 65/30 E; 65/30 R; 65/32; 65/111; 65/116; 65/DIG. 14; 423/333; 428/410; 51/307
[58] Field of Search ............. 65/DIG. 14, 30 R, 116, 65/30 E, 23, 111, 32; 106/74, 54, 53; 428/410, 428, 426; 51/301, 306, 302, 304, 305, 307, 309; 423/333

[56] References Cited

U.S. PATENT DOCUMENTS

| | | | |
|---|---|---|---|
| 2,016,892 | 10/1935 | Clarude | 51/307 |
| 3,186,816 | 6/1965 | Wartenberg | 65/116 |
| 3,811,853 | 5/1974 | Bartholomew et al. | 65/23 |
| 3,816,107 | 6/1974 | Searight et al. | 65/30 R |
| 3,839,226 | 10/1974 | Yates | 423/333 X |
| 3,844,754 | 10/1974 | Grubb et al. | 65/30 E |

*Primary Examiner*—Richard V. Fisher
*Assistant Examiner*—F. W. Miga

*Attorney, Agent, or Firm*—Clinton S. Janes, Jr.; Clarence R. Patty, Jr.

[57] ABSTRACT

The present invention is concerned with the production of sodium and/or potassium hydrosilicate glass bodies. The basis of the invention resides in the hydration of anhydrous sodium and/or potassium silicate glass bodies in aqueous alcohol solutions to impart enhanced mechanical strength and thermoplastic properties thereto. The hydrating process, which permits close control to be maintained over the water content absorbed in the glass, can be carried out in liquid solutions of water and relatively short chain, i.e. up to about five carbon atoms, aliphatic alcohols or in gaseous atmospheres of such solutions. An ion exchange reaction of $Li^+$ ions or protons with $Na^+$ and/or $K^+$ ions can be promoted at temperatures above the transformation range of the hydrated glass, and an exchange of $K^+$ ions for $Na^+$ and/or $Li^+$ ions at temperatures below the transformation range. The invention also contemplates treating sodium and/or potassium hydrosilicate glass bodies, produced through the previous hydration of sodium and/or potassium silicate glass bodies, in a gaseous or liquid alcohol or water-alcohol mixture to impart increased strength and impact resistance thereto and alter the absorbed water content therein. The aforementioned ion exchange reactions are also applicable here.

13 Claims, No Drawings

HYDRATION OF SILICATE GLASSES IN ALCOHOL-WATER SOLUTIONS

BACKGROUND OF THE INVENTION

The hydration of alkali metal-containing silicate glass bodies in a steam-containing atmosphere to effect the diffusion of water into the glass structure and thereby endow the glass with thermoplastic properties is well-known to the art. An early disclosure of that practice can be found in U.S. Pat. No. 3,498,803 which describes the steam hydration of certain glass and glass-ceramic compositions to impart plastic or rubbery characteristics thereto. That patent cites anhydrous glass compositions operable in the process as consisting essentially, in mole percent on the oxide basis, of about 6–40% $Na_2O$ and/or $K_2O$ and 60–94% $SiO_2$, the sum of those components constituting at least 85 mole percent of the total composition. As compatible metal oxides suitable as additives to modify the properties of the glasses, the patent notes the use of $Al_2O_3$, BaO, $B_2O_3$, MgO, PbO, $P_2O_5$, and ZnO. CaO and $Li_2O$ are mentioned as being preferably absent. The hydration process contemplated exposing the anhydrous glass to a gaseous environment containing at least 50% by weight $H_2O$ at a pressure of at least one atmosphere and at a temperature customarily within the range of about 80°–200° C. The hydration treatment was undertaken for a sufficient length of time to cause the development of at least a surface layer on the glass bodies containing about 5–35% by weight water.

A companion disclosure, U.S. Pat. No. 3,498,802, is directed to the steam hydration of certain alkali metal-containing silicate glass powders, the penetration of water into the powders giving rise to thermoplastic properties and, in some instances, yielding products illustrating the characteristics of hydraulic cement. The anhydrous glass powders had compositions consisting essentially, in mole percent on the oxide basis, of about 6–20% $Na_2O$ and/or $K_2O$ and 80–94% $SiO_2$, the sum of those ingredients constituting at least 90 mole percent of the composition. Again, $Al_2O_3$, BaO, $B_2O_3$, MgO, PbO, $P_2O_5$, and ZnO are indicated as possible useful additions, whereas CaO and $Li_2O$ are preferably to be avoided. The hydration process comprehended subjecting the glass powders to a gaseous atmosphere containing at least 50% by weight $H_2O$ at a pressure of at least one atmosphere and a temperature normally between about 100°–200° C. Up to 30% by weight $H_2O$ is diffused into the glass structure.

A number of the glass products produced via the disclosures of those patents exhibited such poor resistance to weathering and chemical durability that, except for protecting the surfaces thereof from the ambient environment, the articles rapidly lost their plastic or rubbery properties. Advantage was taken of that phenomenon in U.S. Pat. No. 3,811,853, which described the formation of alkali metal-containing silicate products that will, under certain conditions, self-degrade in the ambient environment. Such glasses have anhydrous compositions consisting essentially, in weight percent on the oxide basis, of 10–30% $Na_2O$ and/or $K_2O$ and 65–90% $SiO_2$, the sum of those components constituting at least 80% of the total composition. The self-degradation phenomenon commences spontaneously after the weathering-resistant surface has been purposely penetrated or removed, thereby exposing the poorly resistant interior of the body to the ambient atmosphere.

In summary, the early prior art indicated that the hydration of glass, resulting in the pentration of $H_2O$ into the structure of the glass, provides bodies which, demonstrating thermoplastic properties, can be molded or otherwise formed into useful shapes with relative ease. Unfortunately, however, hydration of the majority of the glass compositions in atmospheres saturated or near-saturated with steam yielded products of high water contents with less than practical chemical durability and resistance to weathering. Therefore, to enhance those characteristics, it has been found necessary to have a lower water content in the glass. Three processes have been developed for that purpose.

The first process is disclosed in U.S. Pat. No. 3,912,481. That method involved a two-step procedure wherein an alkali metal-containing silicate glass was initially hydrated in a saturated or near-saturated (at least 75% relative humidity) steam environment at elevated temperatures i.e., at temperatures above 100° C., but below the softening point of the anhydrous glass, and pressures above atmospheric pressure and, thereafter, the glass was dehydrated in an atmosphere of lower relative humidity. The dehydration step is conducted in such a manner that the amount of water remaining in the glass can be carefully controlled to furnish the desired thermoplasticity to the glass, while also insuring satisfactory durability. Anhydrous glass compositions operable in that method consist essentially, in mole percent on the oxide basis, of 3–25% $Na_2O$ and/or $K_2O$ and 50–95% $SiO_2$, the sum of those constituents composing at least 55 mole percent of the total composition. As useful optional additions, the patent notes the utility of up to 25% $Al_2O_3$, up to 20% BaO, up to 25% $B_2O_3$, up to 25% CaO, up to 35% MgO, up to 20% PbO, and up to 25% ZnO.

The second process is disclosed in U.S. application Ser. No. 445,454, filed Feb. 25, 1974 in the names of Pierson and Tarcza, abandoned in favor of continuation-in-part Ser. No. 822,877, filed Aug. 8, 1977. The method described therein is explicitly designed for hydrating fine-dimensioned articles, e.g., beads, granules, powders, and ribbon, of alkali metal-containing silicate glasses. The method comprehends a one-step process at high temperatures (higher than 225° C. but below the softening point of the anhydrous glass) wherein the hydrating environment is of low relative humidity (less than 50%). The low steam content of the hydrating atmosphere results in a relatively slow rate of water penetration into the glass such that control of the water content taken up by the glass can be had. The process is useful with glasses having compositions like those operable in U.S. Pat. No. 3,912,481. However, since the water content of the steam environment is low, this method is drawn to fine-dimensioned bodies where the water introduced through the steam treatment can diffuse therethrough within a not unreasonably long space of time.

The third process is disclosed in U.S. Pat. No. 3,948,629. That method is founded in a one-step process wherein fine-dimensioned anhydrous glass bodies are hydrated in an acidic aqueous solution, i.e., an aqueous solution containing an acid or salt to yield a pH of less than 6, at temperatures between about 100°–374° C. and pressures in excess of 20 psig. By varying the glass composition, the composition of the hydrating solution, and the physical parameters of temperature and pressure, it is possible to closely control the amount of water taken into the glass structure. The process is operable with anhydrous glass compositions of the type reported in U.S. Pat. No. 3,912,481.

Each of the above three processes, while indeed permitting control of water content within the glass structure to be exercised, has certain drawbacks. For example, the two-step method described in U.S. Pat. No. 3,912,481 requires much care to be undertaken during the dehydration step to prevent foaming. Consequently, the dehydration step normally demands the presence of a nitrogen or other inert gas overpressure to avoid foaming. The single-step process of U.S. application Ser. No. 822,877 is quite slow and employs high temperatures, both of those factors being disadvantageous from a commercial point of view. Finally, care must be exercised in the solution hydration process of U.S. Pat. No. 3,948,629 to avoid attack upon and leaching of the glass.

The thermoplastic character of the hydrated glasses produced in accordance with the methods of those inventions has led to considerable research being undertaken to form shapes of various geometries therefrom. For example, articles of widely-varying configurations and dimensions have been compression molded therefrom. Whereas the glasses do, indeed, demonstrate a plastic character, when compared vis-a-vis with anhydrous glass, the mechanical strength thereof was only about equivalent to that of anhydrous glass and the impact resistance only slightly improved.

One application which has been the subject of extensive research has centered around the pressing of ophthalmic lenses from hydrosilicate glasses. The United States Food and Drug Administration has decreed [Federal Register 36(95):8939,1971] that to be used for such purpose a 2 mm thick section of glass must withstand the impact resulting from the fall of a stainless steel ball having a diameter of ⅝" from the height of 50". Hydrosilicate glasses produced in the conventional manner would not invariably pass that test successfully.

OBJECTIVES OF THE INVENTION

Therefore, the primary objective of the invention is to provide a method for hydrating sodium and/or potassium silicate glasses wherein the water content taken into the glass structure can be carefully controlled to secure desired thermoplastic properties, but which method will not be subject to the drawbacks of the above-recited prior art.

A second objective of the invention is to provide a method for hydrating sodium and/or potassium silicate glasses which will not only exhibit thermoplastic properties but also will demonstrate mechanical strengths and impact resistances greater than those of hydrosilicate glasses produced through conventional hydration methods.

A third objective of the invention is to provide a method for treating previously hydrated sodium and/or potassium silicate glass bodies in order to alter the water content therein and to impart improved mechanical strength and impact resistance thereto.

A fourth objective of the invention is to provide a method for causing an ion exchange reaction of $Li^+$ ions or protons from an external source with $Na^+$ and/or $K^+$ ions in sodium and/or potassium hydrosilicate glass bodies.

A fifth objective of the invention is to provide a method for causing an ion exchange reaction of $K^+$ ions from an external source with $Na^+$ and/or $Li^+$ ions, if present, in sodium and/or potassium hydrosilicate glass bodies.

SUMMARY OF THE INVENTION

Those objectives can be attained by hydrating anhydrous glass bodies having compositions consisting essentially, in mole percent on the oxide basis, of about 3-25% $Na_2O$ and/or $K_2O$ and 50-95% $SiO_2$, the sum of those components constituting at least 55 mole percent of the total composition. In the basic process, the hydration is conducted in an aqueous solution of a relatively short chain aliphatic alcohol, i.e., an aliphatic alcohol containing up to about five carbon atoms, at elevated temperatures and pressures, viz., at temperatures above 100° C. and pressures in excess of atmospheric pressure. Whereas hydration of the anhydrous glass can be achieved in liquid water-alcohol solutions, the preferred practice utilizes a gaseous environment. Leaching or etching of the glass has been shown to occur in the solution hydration of certain glass compositions, particularly in solutions wherein the pH is greater than about 5.

In like manner to steam hydration and hydration in acidic aqueous solutions, the most rapid diffusion of $H_2O$ into the glass structure occurs in the simple alkali metal silicate glasses where the alkali content is quite substantial, i.e., at least about 10 mole percent. As was noted above, however, such glass compositions lack chemical durability and resistance to weathering. Consequently, the inclusion of other ingredients into the base alkali silica composition can be helpful in modifying the chemical and physical attributes of both the original anhydrous glass and the hydrated glass. Hence, the addition of such compatible metal oxides as $Al_2O_3$, BaO, $B_2O_3$, CaO, MgO, PbO, and ZnO can work to improve the melting and forming capabilities of the base glass and/or the chemical durability of both the base glass and the hydrated glass. In general, the useful amounts of those additions comprise up to about 25% $Al_2O_3$, up to 20% BaO, up to 25% $B_2O_3$, up to 25% CaO, up to 35% MgO, up to 25% PbO, and up to 25% ZnO. The presence of other compatible metal oxides can be tolerated, but individual additions thereof will advantageously be held below about 10 mole percent. $Li_2O$ seems to inhibit hydration such that, if present at all, the amount thereof will be maintained at a level below about 5 mole percent. CaO in substantial amounts commonly yields a translucent or opaque hydrated body and, therefore, will not be included where a transparent hydrated article is desired.

An especially useful group of glasses exhibiting good chemical durability and excellent transparency after hydration has anhydrous compositions consisting essentially, in mole percent on the oxide basis, of about 72-82% $SiO_2$, 10-17% $Na_2O$ and/or $K_2O$, and 5-20% PbO and/or ZnO. Up to 5% $Al_2O_3$ and up to 3% $B_2O_3$ and/or BaO and/or MgO may also be included.

The method of this embodiment of the invention consists of the following three general steps:

First, a batch for a particular glass composition is compounded, melted, and the melt formed into desired shapes;

Second, the anhydrous glass shapes are contacted with a gaseous atmosphere or a liquid solution containing a mixture of $H_2O$ and a short chain aliphatic alcohol at a temperature greater than 100° C. and at a pressure in excess of atmospheric pressure for a period of time sufficient to hydrate at least a surface portion of the glass shapes; and then Third, the hydrated glass shapes are cooled to room temperature.

The rate of hydration of any particular glass composition is directly related to the temperature and pressure employed. Customarily, hydration will be more rapid at higher temperatures and pressures. The maximum temperature which can be successfully utilized during the hydration reaction is determined by the refractoriness of the glass and the resistance of the composition to attack by $H_2O$. This latter factor is of greater importance where a liquid solution constitutes the hydration medium. Stated differently, the glass bodies must maintain their physical integrity during the hydration process. Surface attack and/or softening of the glass bodies are normally unwanted phenomena. Therefore, temperatures below the softening point of the anhydrous glass will normally be utilized.

As is well-known in the art, there is a maximum temperature at which any gas can be liquefied. That temperature has been denominated the critical temperature. As a corollary, there is a critical pressure required to liquefy a gas at the critical temperature. The critical temperature for water is about 374° C. and the critical pressure about 3200 psig. At temperatures above about 374° C., $H_2O$ has been defined as a fluid which is not considered to be either a liquid or gas. The critical temperatures for the alcohols operable in the present invention are lower than that of water.

In summary, therefore, whereas the hydrating process can be conducted at temperatures up to the softening point of the anhydrous glass, a temperature of 374° C. and a pressure of 3200 psig have been deemed practical operating maxima for those parameters.

The water content which will be absorbed into a glass structure is a function of two factors: (1) the composition of the glass; and (2) the composition of the hydrating medium. Thus, when those two factors are held constant, the time, temperature, and pressure employed in the hydration process will determine the depth of water penetration into the glass, i.e., the rate of the hydration reaction.

The addition of an aliphatic alcohol to water causes a decrease in the amount of water which will be absorbed into any particular glass structure. This, then, permits the absorption of a carefully controlled amount of water into a glass structure which will be sufficient to impart thermoplastic characteristics to the glass while, at the same time, permitting the attainment of good chemical durability in those hydrated compositions wherein the original anhydrous glass exhibited good durability. In general, the rate of hydration appears to be decreased as the length of the carbon chain in the alcohol is increased. Therefore, alcohols containing no more than about five carbons are greatly to be preferred. Likewise, the rate of reaction and the amount of water diffused into the glass are reduced as the ratio of alcohol:$H_2O$ in the hydration medium is increased. This has resulted in a ratio of alcohol:$H_2O$ of about 9:1 by volume being deemed a practical maximum.

Electron microprobe analysis of glass samples before and after hydration in alcohol-water solutions will show that dealkalization of the glass takes place to a substantial depth therein, this depth being a function, of course, of the hydration reaction parameters including time. Hence, there is an exchange of $Na^+$ and/or $K^+$ ions from the glass with protons ($H^+$) from the alcohol-water mixture to yield a surface compression layer in the glass. The final product exhibits an increase in weight which is believed to arise from the diffusion process of $H_2O$ entering the glass structure. Thus, the total weight change is concluded to comprise the mass balance of water and protons entering and $Na^+$ and/or $K^+$ ions leaving the glass.

Improved impact resistance and mechanical strength result from this dealkalization of the glass. In general, a depth of dealkalization on the order of about 0.1 mm appears to be optimum for enhancement of mechanical strength, whereas improvement in impact resistance can be achieved at even greater depths. Thus, at exchange depths below about 0.1 mm, some stress relaxation is indicated through strength measurements (modulus of rupture). In contrast, impact resistance appears to be effected little, if any, by stress relaxation.

Considerable improvement in mechanical strength, but with little change in impact resistance, can be secured where an exchange of $Li^+$ ions for $Na^+$ and/or $K^+$ ions is undertaken during the hydration step at temperatures above the transformation range of the hydrated glass. This can be accomplished by including a soluble lithium salt in the alcohol-water mixture. The depth of the surface compression layer is much less than that observed in the alcohol-water hydration alone. In sum, the surface exchange layer produced is much shallower, but under higher compressive stress, than that resulting via the simple alcohol-water solution hydration. This circumstance gives rise to high mechanical strengths but less effect on impact resistance.

In a somewhat like manner to the $Li^+$ ion exchange above, hydration of the anhydrous glasses in an alcohol-water solution containing a minor amount of acetic acid at a temperature above the transformation range of the hydrated glass leads to dealkalization thereof through an ion exchange reaction taking place between the $Na^+$ and/or $K^+$ ions in the glass and protons ($H^+$ ions) from the solution. The net result is similar to that proposed above for the alcohol-water reaction with the glass, but the acetic acid appears to compete for the $Na^+$ and/or $K^+$ ions at the surface of the glass, thereby decreasing the number of sites available for the alcohol to dealkalize. Thus, substantially increased modulus of rupture values were measured after hydration in the acetic acid-alcohol-water mixtures, whereas the impact resistance was not improved. Hence, the depth of the reaction layer is relatively shallow.

Finally, also in an analogous manner to the $Li^+$ ion exchange described above, hydration of the anhydrous glasses at temperatures below the transformation range of the hydrated glass in an alcohol-water solution containing a soluble potassium salt can result in the exchange of $K^+$ ions for $Na^+$ ions and any $Li^+$ ions. Again, the depth of the surface layer is generally less than that developed via the alcohol-water hydration alone but under a higher compressive stress. Therefore, the articles exhibit higher mechanical strengths than those hydrated in the alcohol-water solutions alone, but there appears to be little effect upon impact resistance.

In a second embodiment of the invention, anhydrous sodium and/or potassium silicate glass bodies are hydrated, utilizing either a gaseous or liquid alcohol-water solution such as is described above, or simply a steam or liquid water environment such as is described, for example, in the above-mentioned U.S. Pat. Nos. 3,498,802, 3,498,803, 3,912,481 and 3,948,629.

Thereafter, the hydrated bodies are subjected to a liquid alcohol or alcohol-water solution at elevated temperatures and pressure, i.e., temperatures above 100° C. and pressures above one atmosphere. As was noted above, the amount of water diffused into a glass is reduced as the ratio of alcohol:$H_2O$ in the hydration medium is increased. Consequently, where a liquid alcohol or a liquid alcohol-$H_2O$ solution is used having a higher alcohol:$H_2O$ ratio than that employed in the initial hydration step, a loss of water from the glass occurs. Alternatively, where an alcohol-$H_2O$ solution is utilized having a lower alcohol:$H_2O$ ratio than that employed in the initial hydration process, an increase in water in the glass will be seen.

Electron microprobe analyses of the hydrated glass samples before and after treatment in the liquid alcohol or alcohol-water solutions will show that dealkalization of the glass takes place to a substantial depth therein, the extent of this dealkalization being dependent upon the treatment parameters, including time. Thus, there is an exchange of $Na^+$ and/or $K^+$ ions from the glasses with protons ($H^+$) from the alcohol or alcohol-water solution which leads to the development of an integral surface layer in the glass. The total weight change is deemed to involve the mass balance of water and protons entering the glass structure and the $Na^+$ and/or $K^+$ ions leaving therefrom.

This treatment of the hydrated glass in liquid alcohol or alcohol-water solutions imparts considerably improved mechanical strength and impact resistance to the glass bodies. Again, as was observed above in the first embodiment of the invention, a depth of dealkalization on the order of about 0.1 mm seems to constitute an optimum for improvement in mechanical strength, whereas increased impact resistance can be seen at even greater depths of dealkalization.

Inclusion of a soluble lithium salt in the treating liquid also promotes an exchange of $Li^+$ ions for $Na^+$ and/or $K^+$ ions where the treatment is conducted at temperatures above the transformation range of the hydrated glass. In this instance, not only is the depth of the surface compression layer much less than that developed in the alcohol-water hydration of the anhydrous glass, but also the resultant glass displays a slight weight loss which is thought to indicate little change in the water content of the hydrated layer. The surface layer so produced is much thinner, but under higher compressive stress, than that generated in the liquid alcohol-water solution treatment alone. This surface layer leads to enhanced mechanical strength but has little effect upon impact resistance.

Treatment of previously hydrated glasses in a liquid alcohol-water solution containing a minor amount of acetic acid at temperatures above the transformation range of the hydrated glass, as was noted above in the first embodiment of the invention, causes dealkalization of the glass by means of an ion exchange reaction occurring between the $Na^+$ and/or $K^+$ ions in the glass and the protons ($H^+$ ions) from the solution. The result of the exchange is seen in significantly enhanced modulus of rupture measurements but little effect on impact resistance. Thus, the depth of the reaction layer is quite shallow, the explanation therefor being conjectured that the acetic acid competes for the $Na^+$ and/or $K^+$ ions at the surface of the glass, thereby decreasing the number of sites available for the alcohol to dealkalize.

Finally, where a soluble potassium salt is included in a liquid alcohol-water solution and a previously-hydrated glass body is contacted with the resultant solution at a temperature below the transformation range of the hydrated glass, an exchange of $K^+$ ions for $Na^+$ ions and any $Li^+$ ions present takes place. The surface layer developed is normally shallower than that resulting from the simple alcohol-water treatment but under greater compressive stress. The articles so produced demonstrate higher mechanical strengths than those treated in an alcohol-water solution alone. However, the effect on impact resistance appears to be slight.

DESCRIPTION OF PREFERRED EMBODIMENTS

Table I reports several glass compositions, expressed both in mole percent and in parts by weight on the oxide basis, which are operable in the instant invention. Because the sum of the individual components totals or closely approximates 100, for all practical purposes the constituents recited in terms of parts by weight may be deemed to be present in terms of weight percent. The batch ingredients useful therefor can comprise any materials, either the oxides or other compounds, which, when melted together, will be converted into the desired oxides in the proper proportions. The batch constituents were mixed together thoroughly, commonly in a ball mill to assist in securing a homogeneous melt, and then melted in platinum or silica crucibles for about 16 hours at 1450°–1550° C. (It will be recognized that larger melts can be made in pots or continuous melting tanks in accordance with conventional commercial glassmaking practice). Thereafter, the crucible melts were shaped into bodies of desired configurations utilizing glass forming techniques well-known to the art. For the data recorded in Table II infra, plates of the indicated thicknesses comprised the test samples.

TABLE I

| | 1 | 2 | 3 | 4 | 5 | 6 | 7 |
|---|---|---|---|---|---|---|---|
| | | | (Parts by Weight) | | | | |
| $SiO_2$ | 73.0 | 78.8 | 77.0 | 76.72 | 84.3 | 43.5 | 42.9 |
| $Na_2O$ | 10.5 | 21.2 | 22.0 | 21.4 | 15.7 | 7.0 | 7.9 |
| $K_2O$ | 4.5 | — | — | — | — | 5.2 | 5.0 |
| $Al_2O_3$ | 2.0 | — | 1.0 | 1.88 | — | 1.0 | 1.9 |
| ZnO | 10.0 | — | — | — | — | — | — |
| PbO | — | — | — | — | — | 41.1 | 40.0 |
| $ZrO_2$ | — | — | — | — | — | 2.0 | 2.0 |
| | 1 | 2 | 3 | 4 | 5 | 6 | 7 |
| | | | (Mole Percent) | | | | |
| $SiO_2$ | 76.9 | 78.2 | 77.6 | 77.6 | 83.9 | 65.6 | 64.5 |
| $Na_2O$ | 10.8 | 21.8 | 21.6 | 21.2 | 16.1 | 10.2 | 11.5 |
| $K_2O$ | 3.0 | — | — | — | — | 5.0 | 4.8 |
| $Al_2O_3$ | 1.3 | — | 0.6 | 1.2 | — | 0.7 | 1.7 |
| ZnO | 7.8 | — | — | — | — | — | — |
| PbO | — | — | — | — | — | 16.7 | 16.1 |
| $ZrO_2$ | — | — | — | — | — | 1.8 | 1.4 |

Table II records a number of hydration treatments applied to anhydrous glass samples prepared from the glass compositions of Table I. The hydration process were carried out in an autoclave since such apparatus allows careful control of temperature and pressure. All the results reported in the table reflect autoclaving in the vapor phase, i.e., a gaseous mixture of $H_2O$ and alcohol, except for the last example which was hydrated by immersion in the solution.

As can be appreciated, the time required for hydrating a glass sample completely through the thickness measurement thereof is dependent upon the composition of the glass and the composition of the contacting water-alcohol mixture, as well as upon the pressure and the temperature employed in the hydration process. Self-evidently, then, when those four parameters are held constant, the time required for achieving total hydration of a glass body is directly related to the thickness measurement thereof. Furthermore, whereas the preferred embodiment of the invention comprehends the penetration of water throughout the glass structure such as to impart thermoplasticity to the entire body, it can be appreciated that the production of only a surface hydrated layer on a body can have utility, e.g., improved mechanical strength and/or impact resistance. Accordingly, with a thin-walled article of a simple alkali metal silicate composition of high alkali content, hydration may be accomplished within several minutes. In contrast, thick-walled articles of relatively durable anhydrous glass compositions may demand numerous hours and even days for complete hydration. However, the modifying of temperature, pressure, and water-alcohol mixture to secure the most efficient means for achieving the desired water content in a particular glass composition is well within the technical grasp of the glass technologist.

For convenience, the data reported in Table II reflect only work conducted with water-methanol ($CH_3OH$) mixtures. A zero (0) in the $CH_3OH/H_2O$ column indicates the absence of $CH_3OH$. Such examples illustrate the effect which $CH_3OH$ has upon the amount of water absorbed into the glass structure. Sufficient liquid was placed in the bottom of the autoclave to insure a saturated gaseous atmosphere within the unit. The pressure recorded is that of gauge pressure (psig.). The loss on ignition (L.O.I.) indicates the change in weight observed when the hydrated glass is subsequently fired to dryness, and provides a measure of the water content absorbed into the glass structure as a result of the hydration treatment.

ambient temperature, a L.O.I. of 43% was measured on the sample. A 1.5" diameter disc of the hydrated plate was then immersed into a $CH_3OH$—$H_2O$ solution having a volume ratio of 1.66 and autoclaved for 16 hours at 130° C. A L.O.I. of about 22% was measured, thereby indicating a loss of about one-half of the water taken up in the glass during the saturated steam hydration.

It can be appreciated that, where desired, various inert gases such as nitrogen, $CO_2$, argon, and helium can be injected into the autoclave environment to maintain a higher overall pressure therewithin when the partial pressure of alcohol-steam is reduced. Such practice prevents foaming of the hydrated glass, but that phenomenon does not here pose the severe problem experienced in the use of steam pressures alone. Also, the introduction of minor amounts of acid vapors, e.g., $SO_2$ or $SO_3$, can be useful in improving the chemical durability of the hydrated surface and/or enhancing the mechanical strength of the glass.

In order to illustrate the effect upon mechanical strength and resistance to impact which the hydration processes of the present invention have upon sodium and/or potassium silicate glasses, the following studies were made.

As a reference point, plates of Example 1 having dimensions of 4" × 2" × 3 mm were contacted in an autoclave with a saturated steam atmosphere at 300° C. for four days. The glass was dehydrated via exposure to a 1200 psig over-pressure of nitrogen for seven days at 0% relative humidity. Such hydration-dehydration technique is disclosed in U.S. Pat. No. 3,912,481. Loss on ignition indicated an average water content of 6.9% in the final glass. Stress bars ($1\frac{1}{4}$" × 0.18" × 0.08") and

TABLE II

| Example No. | $CH_3OH/H_2O$ | Temp. °C. | Time Hours | Pressure Psig. | L.O.I. Weight % | Observations |
|---|---|---|---|---|---|---|
| 1 | 0 | 300 | 96 | 1200 | 10.7 | 3 mm thick plate hydrated completely |
| 1 | 1 | 295 | 34 | 1800 | 9.5 | approximately one-third of 3 mm. thick plate hydrated |
| 1 | 1.22 | 304 | 30 | 1975 | 9.3 | 1 mm thick plate hydrated with thin central plane unhydrated |
| 1 | 1.66 | 304 | 81 | 2050 | 7.8 | approximately one-third of 3 mm thick plate hydrated |
| 2 | 0 | 140 | 4 | 38 | 32.0 | 1 mm thick plate hydrated completely |
| 2 | 2 | 160 | 16 | 240 | 18.5 | " |
| 2 | 1.66 | 180 | 16 | 320 | 22.1 | " |
| 3 | 2 | 160 | 16 | 240 | 16.4 | " |
| 4 | 0 | 140 | 10 | 38 | 41.0 | " |
| 4 | 2 | 160 | 16 | 240 | 14.1 | " |
| 2* | 1.66 | 180 | 16 | 320 | 24.9 | " |

*Autoclaved in solution

An inspection of Table II clearly points up the following two factors:
(1) the rate of hydration is reduced as the water content of the solution is decreased; and
(2) the water content of the hydrated glass is reduced as the water content of the solution is decreased.

Finally, not only does the instant invention enable control to be had of the level of water absorbed within a glass structure during hydration of an anhydrous glass, but it also permits a glass body that has been initially hydrated in saturated steam to be re-hydrated in an alcohol-water solution to a lower water concentration in the glass. This was demonstrated using glass of Example 5 of Table I.

Thus, a 1 mm thick plate of that glass was hydrated completely therethrough after exposure to saturated steam for 6.5 hours at 140° C. After a residence time of two weeks in a 100% relative humidity atmosphere at discs ($1\frac{1}{4}$" diameter × 2 mm thickness) were cut therefrom and prepared with ground and polished surfaces.

Modulus of rupture measurements were made with the stress bars utilizing a single knife edge. Ball impact strengths were determined employing a $\frac{5}{8}$" diameter stainless steel ball. The height of the ball drop was measured to within ±1". Intervals of 6" were used between drops. An average of four samples gave a modulus of rupture value of about 9000 psi. The discs all failed at less than 24 inches in the ball drop test.

Table III chronicles a group of methanol-water solution hydration treatments applied to plate and disc samples of Example 1 which had been hydrated and dehydrated in a steam atmosphere in like manner to the above-described samples. The work was conducted both in the liquid and the gaseous phase utilizing an autoclave having a sufficient liquid reservoir to insure a saturated gaseous environment within the unit.

TABLE III

| Methanol-H$_2$O Volume Ratio | Temp. °C. | Time Hours | Modulus of Rupture | Ball Drop Height |
|---|---|---|---|---|
| Untreated - 6.9% H$_2$O | | | ~9000 psi | <24" |
| 0.9 | 180 | 4 | ~16,000 psi | 84" |
| 1 | 204 | 16 | ~9000 psi | 84" |
| 1.66 | 200 | 40 | ~15,000 psi | 84" |
| 1.66 | 180 | 16 | ~9350 psi | —(Vapor) |
| 1.66 | 180 | 16 | ~6000 psi | 108" |
| 1.66 | 180 | 4 | ~17,000 psi | 96" |
| 1.66 | 180 | 1 | ~17,000 psi | 72" |
| 2 | 160 | 16 | ~8000 psi | — |
| 3 | 180 | 16 | ~15,000 psi | —(Vapor) |
| 3 | 180 | 16 | ~16,000 psi | 84" |

As is evident from Table III, treatment in a methanol-H$_2$O environment can, indeed, result in improved mechanical strength and resistance to impact. It appears that both the modulus of rupture and the ball drop values are highest at about 180° C. (the transformation range of the hydrated glass is about 185° C., as determined through Differential Thermal Analysis). The increases in mechanical strength, however, are not as dramatic as the increases in impact resistance. Also, the modulus of rupture data indicate apparent stress relaxation after more than about four hours at 180° C., whereas the ball impact resistance continues to increase up to 16 hours treatment time. Hence, there appears to be little correlation between the modulus of rupture and ball drop findings.

Table IV reports a number of hydration treatments applied to plate and disc samples of Example 1 which had been hydrated and dehydrated in a steam atmosphere in like manner to those described above in Table III, wherein a liquid environment was employed which consisted of methanol-water solutions into which a lithium salt had been dissolved. Again, the trials were undertaken in the liquid phase using an autoclave.

TABLE IV

| Methanol-H$_2$O Volume Ratio | Lithium Salt/ 100 mls. Solution | Temp. °C. | Time Hours | Modulus of Rupture | Ball Drop Height |
|---|---|---|---|---|---|
| 4 | 1 g Li Acetate | 204 | 40 | ~15,000 psi | — |
| 2 | 0.5 g LiCl | 204 | 16 | — | 84" |
| 1.66 | 1 g Li Acetate | 200 | 40 | ~22,000 psi | — |
| 1.66 | 1 g Li Acetate | 204 | 40 | ~25,000 psi | — |
| 1 | 2 g Li Acetate | 204 | 16 | ~13,000 psi | 54" |
| 0.5 | 0.5 g Li Acetate | 204 | 16 | — | 84" |

It can be seen that the inclusion of lithium salts in the alcohol-water hydration medium can result in even greater improvements in mechanical strength than produced through the alcohol-water solution alone. When viewed optically, the stress gradient shows a much shallower surface compression layer than that seen in the simple alcohol-water solution treatment. Finally, in the samples treated in liquid solutions containing dissolved lithium salts, the glass lost weight. This circumstance is believed to be indicative of a small-ion-for-large-ion exchange, or a total flux of water out of the glass. In general, the addition of a soluble lithium salt will be limited to about 5% by weight.

Table V lists three hydration treatments applied to plate and disc samples of Example 1 which had been hydrated and dehydrated in a steam atmosphere in accordance with the method described above in Table III and IV, wherein the liquid environment was composed of an equi-volume methanol-water mixture into which specified amounts of acetic acid had been dissolved. In each instance, the samples were exposed to the solution for four hours at 180° C. in an autoclave.

TABLE V

| Acetic Acid Added to 100 ml. Methanol-Water | Modulus of Rupture | Ball Drops Height |
|---|---|---|
| 0.1 ml | ~18,000 psi | — |
| 1.0 ml | ~17,000 psi | 24" |
| 5.0 ml | ~20,000 psi | 24" |

The modulus of rupture values are approximately twice those measured on the untreated samples (~9000 psi), but the impact resistance, while greater than that of the untreated samples (<24"), is disappointing. Thus, the glasses would not successfully pass the test prescribed by the United States Food and Drug Administration for ophthalmic lenses (a ball drop height of at least 50"). It is quite apparent that depth of the ion exchanged surface layer is very shallow. In like manner to the lithium salt compounds discussed above, the amount of acetic acid added to the alcohol-H$_2$O solution will normally not exceed about 5% by weight.

A review of the foregoing Tables III, IV, and V would seem to indicate two pertinent factors: (1) an increase in mechanical strengths, coupled with a very pronounced enhancement in impact resistance, is imparted to the hydrated glasses of the invention when contacted with alcohol-water solutions; and (2) a somewhat greater increase in mechanical strengths accompanied, but not necessarily, by an improvement in impact resistance is imparted to the hydrated glasses when subjected to an ion exchange reaction with Li$^+$ ions or protons in an alcohol-water solution environment. In general, the greatest improvements in those physical properties are achieved when the process is carried out at a temperature approximating or somewhat above the transformation range of the hydrated glass, viz., at temperatures between about the transformation range of the hydrated glass and 50° C. thereabove.

To illustrate that an exchange of K$^+$ ions from an external source can take place with Na$^+$ ions and any Li$^+$ ions present in the glass structure, the following process is presented. Thus, plate samples of Example 1, which had been hydrated and dehydrated in a steam atmosphere in like manner to that described above with respect to Tables III–V, were treated with a liquid equi-volume methanol-water mixture containing dissolved therein 1 gram of potassium acetate per 100 ml. solution. The samples were immersed in the solution for 22 hours at 160° C. in an autoclave. This temperature is below the transformation range of the hydrated glass. An average modulus of rupture of about 17,700 psi was measured. Thus, much improved mechanical strength is achieved through this ion exchange treatment. In general, additions of a soluble potassium salt will be limited to about 5% by weight and the ion exchange process will be conducted at temperatures about 10°–75° C. below the transformation range of the hydrated glass.

The mechanism responsible for the increase in ball impact strength has been determined from a study of electron microprobe profiles of glasses before and after treatment in alcohol-water solution environment to be dealkalization of the glass. And, inasmuch as the treated glasses increase in weight, it has been postulated that this dealkalization phenomenon is accompanied with a net positive flux of water into the glass.

Two further items of very practical interest are the findings that despite the increased water content in the surface layer of the treated glasses, the glasses appear to demonstrate improved chemical durability and increased surface hardness. Table VI is illustrative of the improved chemical durability of the treated glass. The table reports the amount of $Na_2O$ and $K_2O$ extracted from polished discs of Example 1, which had been hydrated and dehydrated in a steam atmosphere in like manner to the samples of Tables III—V, after the discs had been immersed in distilled $H_2O$ for 22 hours at 70° C. The same test was repeated on other polished discs of Example 1 which were subsequently treated in various alcohol-water environments. The results are recorded in terms of $mg/cm^2$ of disc area.

TABLE VI

| Treatment | $Na_2O$ Extracted | $K_2O$ Extracted |
|---|---|---|
| None | 83.2 | 17.4 |
| Methanol-Water 1:1 Volume 16 hours- 200° C.-Liquid Phase | 8.81 | 1.22 |
| Methanol-Water 2:1 Volume 40 hours- 200° C.-Vapor Phase | 7.99 | 2.08 |
| N-Butanol-Water 4.5:1 Volume 40 hours- 200° C.-Vapor Phase | 18.1 | 2.53 |
| Methanol-Water 3:1 Volume 16 hours- 200° C.-Vapor Phase | 15.5 | 4.22 |

With respect to surface hardness, a measurement of Knoop hardness of the surface of Example 1 hydrated and dehydrated in a steam atmosphere in accordance with Tables III–IV produced a value of about 280. A similar sample treated (liquid phase) in a methanol-water solution of 2.4:1 volume ratio at 200° C. showed a Knoop hardness number of 371 after 24 hours and 312 after 40 hours of such treatment. Such an increase suggests a high silica content (dealkalization) at the glass surface.

The mechanism by which the presence of short chain aliphatic alcohols results in dealkalization of the hydrated glass is not fully understood. No evidence has been forthcoming indicating the penetration of the alcohols into the glass to any measureable extent. That factor has led to the conclusion that the dealkalization by the alcohols occurs as a surface reaction.

The interaction of methanol with oxide surfaces has been studied in the past with particular emphasis on the catalytic aspects of the surface reaction. Sodium methoxide has a low melting point (15° C.) and decomposes above 140° C. Hence, in the inventive process, that compound can be formed and will be rapidly removed from the reaction sites such that equilibrium will not be attained. Consequently, by removing $Na^+$ ions from the glass surface, a concentration gradient is set up which draws $Na^+$ ions from the interior thereof. In contrast, where the hydration reaction is carried out in a steam atmosphere, NaOH is formed which is very stable and remains at the reaction site such that $Na^+$ ions are not removed.

In summary, it would be predicted that any alcohol which forms a sodium salt with a high vapor pressure at the treatment temperature should be capable of causing dealkalization of the glass. The presence of water in the solution is demanded to increase the —Si—OH content of the glass as well as enhance the mobility of the ions concerned.

We claim:

1. A method for making a hydrated glass body which can exhibit improved mechanical strength, impact resistance, Knoop hardness, and chemical durability which consists of the following steps:
    (a) melting a batch for an anhydrous glass consisting essentially, in mole percent on the oxide basis, of about 3–25% $Na_2O$ and/or $K_2O$ and 50–95% $SiO_2$, the sum of those components constituting at least 55% of the total composition;
    (b) forming said melt into an anhydrous glass body of a desired geometry;
    (c) contacting at least a portion of said glass body with a short chain aliphatic alcohol-$H_2O$ containing liquid or gaseous environment in a closed autoclave system at a temperature greater than 100° C. but less than the softening point of the anhydrous glass and at a pressure in excess of atmospheric pressure for a period of time sufficient to hydrate and dealkalize at least said portion of said glass body in an amount effective to impart improved mechanical strength, impact resistance, Knoop hardness, and chemical durability thereto; and then
    (d) cooling said hydrated and dealkalized glass body to room temperature.

2. A method according to claim 1 wherein said anhydrous glass consists essentially, in mole percent on the oxide basis, of about 10–17% $Na_2O$ and/or $K_2O$, 5–20% PbO and/or ZnO, 0–5% $Al_2O_3$, 0–3% $B_2O_3$ and/or BaO and/or MgO, and 72–82% $SiO_2$.

3. A method according to claim 1 wherein said short chain aliphatic alcohol contains up to about five carbon atoms.

4. A method according to claim 1 wherein the volume ratio of alcohol/$H_2O$ ranges up to about 9:1.

5. A method according to claim 1 wherein up to about 5% by weight of a lithium compound is dissolved in said aliphatic alcohol-$H_2O$ containing environment and contact of said glass body with said aliphatic alcohol-$H_2O$ containing environment is made at a temperature between about the transformation range of the hydrated glass and about 50° C. thereabove.

6. A method according to claim 1 wherein up to about 5% by weight of acetic acid is dissolved in said aliphatic alcohol-$H_2O$ containing environment and contact of said glass body with said aliphatic alcohol-$H_2O$ containing environment is made at a temperature between about the transformation range of the hydrated glass and about 50° C. thereabove.

7. A method according to claim 1 wherein up to about 5% by weight of a potassium compound is dissolved in said aliphatic alcohol-$H_2O$ containing environment and contact of said glass body with said aliphatic alcohol-$H_2O$ containing environment is made at a temperature between 10°–75° C. below the transformation range of the hydrated glass.

8. A method for making an hydrated glass body which can exhibit improved mechanical strength, impact resistance, Knoop hardness, and chemical durability which consists of the following steps:

(a) melting a batch for an anhydrous glass consisting essentially, in mole percent on the oxide basis, of about 3–25% $Na_2O$ and/or $K_2O$ and 50–95% $SiO_2$, the sum of those components constituting at least 55% of the total composition;

(b) forming said melt into an anhydrous glass body of a desired geometry;

(c) contacting at least a portion of said glass body with a gaseous or liquid $H_2\text{-}O$-containing environment in a closed autoclave system at elevated temperatures and pressures for a period of time sufficient to hydrate at least said portion of said glass body having an amount of $H_2O$ absorbed therein effective to impart thermoplastic properties thereto;

(d) contacting said hydrated portion of said glass body with a short chain aliphatic alcohol or short chain aliphatic alcohol-$H_2O$ containing liquid or gaseous environment in a closed autoclave system at a temperature between about 75° C. below the transformation range to about 50° C. thereabove at a pressure in excess of atmospheric pressure for a period of time sufficient to dealkalize said portion of said glass body in an amount effective to impart improved mechanical strength, impact resistance, Knoop hardness, and chemical durability thereto; and then (d) cooling said hydrated-dealkalized glass body to room temperature.

9. A method according to claim 8 wherein said anhydrous glass consists essentially, in mole percent on the oxide basis, of about 10–17% $Na_2O$ and/or $K_2O$, 5–20% PbO and/or ZnO, 0–5% $Al_2O_3$, 0–3% $B_2O_3$ and/or BaO and/or MgO, and 72–82% $SiO_2$.

10. A method according to claim 8 wherein said short chain aliphatic alcohol contains up to about five carbon atoms.

11. A method according to claim 8 wherein up to about 5% by weight of a lithium compound is dissolved in said aliphatic alcohol or aliphatic alcohol-$H_2O$ containing environment and contact of said glass body with said alcohol or alcohol-$H_2O$ containing environment is made at a temperature between about the transformation range of the hydrated glass and about 50° C. thereabove.

12. A method according to claim 8 wherein up to about 5% by weight of acetic acid is dissolved in said aliphatic alcohol or aliphatic alcohol-$H_2O$ containing environment and contact of said glass body with said alcohol or alcohol-$H_2O$ containing environment is made at a temperature between about the transformation range of the hydrated glass and about 50° C. thereabove.

13. A method according to claim 8 wherein up to about 5% by weight of a potassium compound is dissolved in said aliphatic alcohol or aliphatic alcohol-$H_2O$ containing environment and contact of said glass body with said alcohol or alcohol-$H_2O$ containing environment is made at a temperature between 10°–75° C. below the transformation range of the hydrated glass.

* * * * *